(12) United States Patent
Ning et al.

(10) Patent No.: US 11,230,472 B2
(45) Date of Patent: Jan. 25, 2022

(54) METHOD AND APPARATUS FOR CAPTURING CARBON DIOXIDE AND PRODUCING SULFURIC ACID BY SODIUM BISULFATE

(71) Applicant: Pingxiang Huaxing Environmental Protection Engineering Technology Co., Ltd, Pingxiang (CN)

(72) Inventors: Ping Ning, Pingxiang (CN); Bo Li, Pingxiang (CN); Chuan Wang, Pingxiang (CN); Kai Li, Pingxiang (CN); Xin Song, Pingxiang (CN); Ruosong Xie, Pingxiang (CN); Lijuan Jia, Pingxiang (CN); Xia Wang, Pingxiang (CN); Guangfei Qu, Pingxiang (CN); Chan Li, Pingxiang (CN)

( * ) Notice: Subject to any disclaimer, the term of this patent is extended or adjusted under 35 U.S.C. 154(b) by 0 days.

(21) Appl. No.: 16/932,718

(22) Filed: Jul. 18, 2020

(65) Prior Publication Data

US 2021/0371282 A1  Dec. 2, 2021

(30) Foreign Application Priority Data

May 26, 2020 (CN) .......................... 202010453657.9

(51) Int. Cl.
| | | |
|---|---|---|
| *C01B 17/80* | (2006.01) | |
| *C25B 1/22* | (2006.01) | |
| *C25B 9/10* | (2006.01) | |
| *C25B 11/04* | (2021.01) | |
| *C25B 11/12* | (2006.01) | |
| *C25B 9/23* | (2021.01) | |
| *C25B 11/043* | (2021.01) | |
| *C25B 11/051* | (2021.01) | |
| *C25B 11/061* | (2021.01) | |

(52) U.S. Cl.
CPC .............. *C01B 17/806* (2013.01); *C25B 1/22* (2013.01); *C25B 9/23* (2021.01); *C25B 11/043* (2021.01); *C25B 11/051* (2021.01); *C25B 11/061* (2021.01)

(58) Field of Classification Search
CPC ........... C01B 17/80; C01B 17/74; C25B 1/22; C01D 7/07; B01D 53/326; B01D 53/50; B01D 53/62; B01D 53/74; B01D 2257/302; B01D 2257/504; B01D 2259/80; B01J 19/087; B01J 2219/0807
See application file for complete search history.

(56) References Cited

U.S. PATENT DOCUMENTS

| | | | | |
|---|---|---|---|---|
| 3,801,698 A | * | 4/1974 | Lowrance et al. ... | B01D 53/965 423/234 |
| 3,824,163 A | * | 7/1974 | Maget ................... | C02F 1/461 95/36 |
| 4,519,881 A | * | 5/1985 | Chang ..................... | C25B 1/22 204/520 |
| 2014/0151240 A1 | * | 6/2014 | Bedell ..................... | C25B 9/19 205/455 |
| 2015/0041323 A1 | * | 2/2015 | Faita ........................ | C25B 5/00 204/533 |
| 2015/0202568 A1 | * | 7/2015 | Yablonsky ............. | B01D 53/56 423/234 |

FOREIGN PATENT DOCUMENTS

| | | | | |
|---|---|---|---|---|
| CN | 107326390 A | * | 11/2017 | ............... C25B 1/22 |
| GN | 101318668 A | | 12/2008 | |

OTHER PUBLICATIONS

Office Action of U.S. Appl. No. 15/989,187 (USPTO), dated Oct. 25, 2019.

* cited by examiner

*Primary Examiner* — Timothy C Vanoy
(74) *Attorney, Agent, or Firm* — W&KIP

(57) ABSTRACT

The present invention refers to the field of flue gas purification, which discloses a method and apparatus for capturing carbon dioxide and producing sulfuric acid by sodium bisulfate; using a three-format electrodialysis apparatus to convert the desulfurized by-product $NaHSO_4$ into $H_2SO_4$ while capturing $CO_2$ in the flue gas in the cathode chamber. Under the action of electric field drive and ion exchange membrane, $HSO_4^-$ enters the anode chamber to generate $H_2SO_4$ and is concentrated, and $Na^+$ enters the cathode chamber to generate NaOH; the flue gas containing $CO_2$ to be treated is introduced from the cathode chamber and absorbed by NaOH. The invention provides a simple, green, and economic proceeding method to capture the carbon dioxide in the flue gas during the comprehensive utilization of sodium bisulfate solution, which is of better environmental benefits and improvement of the flue gas treatment technology and reducing the pressure of desulfurization gypsum treatment.

13 Claims, 2 Drawing Sheets

METHOD AND APPARATUS FOR CAPTURING CARBON DIOXIDE AND PRODUCING SULFURIC ACID BY SODIUM BISULFATE

CROSS-REFERENCE TO RELATED APPLICATIONS

This application claims priority to Chinese Patent Application No. 202010453657.9 with a filing date of May 26, 2020. The content of the aforementioned application, including any intervening amendments thereto, are incorporated herein by reference.

TECHNICAL FIELD

The present disclosure relates to the technical field of flue gas purification, in particular to a method and apparatus for capturing carbon dioxide and producing sulfuric acid by sodium bisulfate.

BACKGROUND

Coal is used as one of the main energy sources in China, and it's particularly significant that the atmospheric pollution caused by the emission of $SO_2$ during coal combustion. Calcium-based wet flue gas desulfurization technology (FGD) is currently the most widely used technology in flue gas of $SO_2$ control, but during the process, 2.7 tons of desulfurized gypsum will be generated for each ton of $SO_2$ removed. Due to the complex composition of the desulfurized gypsum and the low comprehensive utilization rate, the increased amount of desulfurized gypsum poses a huge environmental risk to the soil and groundwater, and also caused great wastes of valuable calcium and sulfur resources. In addition to improving the added value of desulfurized gypsum, developing an environmental-friendly desulfurization process is one of the main goals.

In a similar field, Chinese patent CN761617A discloses a method for preparing sodium bicarbonate and ammonium sulfate by using sodium sulfate solution, by using ammonium bicarbonate to obtain sodium bicarbonate and ammonium sulfate after separation, evaporation, freezing crystallization and other steps. However, the method is complicated in proceeding, high in energy consumption, and pollutants such as irregularly discharged ammonia are difficult to control. In addition, Chinese patent CN101318668A discloses a method for producing ammonium sulfate for agriculture and industrial soda ash with the thenardite ammonia soda process. After dissolving the thenardite in ammonia solution, it is fed with carbon dioxide, and then centrifuged, dried, frozen and crystallized to obtain ammonium sulfate and sodium hydroxide. The process is also complicated, and If the solid thenardite is replaced with a dilute solution, it will result in large energy consumption and high cost.

In recent years, a new desulfurization process converts $SO_2$ absorbed by water into $NaHSO_4$ with higher added value after a certain electrochemical process (Environ. Sci. Technol. 2008, 42, 8585-8590) has been gradually recognized by the market due to its greenness and economy, high efficiency and other characteristics. However, due to the low concentration of the desulfurized product $NaHSO_4$, its utilization value has been limited to some extent. In order to further promote the technology, it is necessary to improve the economic benefits of desulfurized products. In this regard, the present invention discloses a method and apparatus for capturing carbon dioxide and producing sulfuric acid by sodium bisulfate, using $NaHSO_4$ solution as a raw material, capturing $CO_2$ in the flue gas at the cathode through a three-format electrodialysis apparatus, and retrieving $NaHSO_4$ at the anode. This method, on the one hand, converts desulfurized products into sulfuric acid with higher added value, on the other hand, it is used in flue gas treatment, which effectively improves the comprehensive utilization rate of desulfurized by-products.

The process disclosed in the present invention is simple, green, and economical. The carbon dioxide in the flue gas is simultaneously captured during the comprehensive utilization of sodium bisulfate solution, which brings relatively better environmental benefits and will promote the upgrading of national flue gas treatment technology and ease the pressure of desulfurization gypsum treatment.

SUMMARY

One objective of the present disclosure is to overcome the shortcomings of the prior arts by providing a method and apparatus for capturing carbon dioxide and producing sulfuric acid by sodium bisulfate; the method utilizes the electrolysis of sulfur-containing ions generated by the desulfurized products to prepare acidic substance and alkaline substance, meanwhile the alkaline substance adsorbs the carbon dioxide in the flue gas, that is, a three-format electrodialysis apparatus is used to convert the solution containing sulfate and/or sulfite ions into sulfuric acid, e.g. $NaHSO_4$ transfers to $H_2SO_4$, and the $CO_2$ in the flue gas is captured in the cathode chamber.

Specifically, the three-format electrodialysis apparatus is separated by an anion exchange membrane and a cation exchange membrane, and the reacting chamber is sequentially divided into an anode chamber, an intermediate chamber and a cathode chamber.

The desulfurized product solution is stored in the intermediate chamber, the anode chamber is used to produce acidic substance, and the cathode chamber is used to produce alkaline substance.

The desulfurized product liquid is a solution containing sulfate and/or sulfite ions, and the desulfurized product liquid is one or more of $NaHSO_4$, $Na_2SO_4$, $Na_2SO_3$, and $NaHSO_3$.

The initial solution of anode chamber is dilute sulfuric acid of 1 wt. % to 5 wt. %, and the cathode chamber is a NaOH solution with an initial concentration of 0.05 to 0.5 mol/L.

The technical solution of the present disclosure is as follows:

(1) The desulfurized product solution is introduced into the intermediate chamber and circulates through the pump; under the action of electric field drive and anion exchange membrane, sulfate and/or sulfite ions enter the anode chamber selectively, and combine with the $H^+$ from electrolyzed water in the anode chamber to generate $H_2SO_4$; meanwhile, under the action of the electric field drive and the cation exchange membrane, $Na^+$ selectively enters the cathode chamber and combines with the $OH^-$ produced by the electrolyzed water in the cathode chamber to generate NaOH. The main reactions occurred in this process and system are as following:

intermediate chamber: $NaHSO_4 \rightarrow HSO_4^- + Na^+$ $HSO_4^- \rightarrow H^+ + SO_4^{2-}$ anode chamber: $2H_2O - 4e^- \rightarrow O_2(g) + 4H^+$ $H^+ + HSO_4^- \rightarrow H_2SO_4$ $2H^+ + SO_4^{2-} \rightarrow H_2SO_4$ cathode chamber: $2H_2O + 2e^- \rightarrow H_2(g) + 2OH^-$ $OH^- + Na^+ \rightarrow NaOH$ The anion exchange membrane is resistant to sulfuric acid at a concentration more than 40 wt % and the anion selection rate is more than 98%, such as anion exchange membrane of model AMI-7001.

The cation exchange membrane cation selection rate is more than 90%; such as cation exchange membrane of model CMI-7000.

The electric field is driven by a DC constant current voltage applied between the anode and the cathode, and the current density is 30 to 1000 mA/m$^2$; the electrode material is graphite electrode, such as graphite plate, graphite felt and etc., and the anode material can be a corrosion-resistant plate-shaped ruthenium/iridium coated electrode.

(2) The gas containing $CO_2$ to be treated is introduced from the bottom of the cathode chamber and reacts with NaOH to produce $Na_2CO_3$ and $NaHCO_3$; the NaOH consumed during the reaction is supplemented by $OH^-$ generated from the electrolyzed water in the cathode chamber and $Na^+$ migrated from the intermediate chamber. The main reactions occurred in this process and system are as following:

$2NaOH + CO_2 \rightarrow Na_2CO_3 + H_2O$ (with a small amount of $CO_2$)

$NaOH + CO_2 \rightarrow NaHCO_3$ (with an excessive amount of $CO_2$)

The flue gas containing $CO_2$ after dust removal, desulfurization and denitrification, the remaining $CO_2$ content of the gas is 5% to 40%.

In addition to $NaHSO_4$, the present invention is also applicable to desulfurization solutions containing sulfate and sulfite ions such as $Na_2SO_4$, $Na_2SO_3$, $NaHSO_3$.

The sulfite-containing solutions such as $Na_2SO_3$ and $NaHSO_3$ will be oxidized to sulfate after the anion enters the anode chamber in the system, which will combine with $H^+$ produced by electrolyzed water to generate $Na_2SO_4$. The main reactions are:

$$2SO_3^{2-} + O_2 \xrightarrow{electricity} 2SO_4^{2-}$$

$$2HSO_3^- + O_2 \xrightarrow{electricity} 2SO_4^{2-} + 2H^+$$

Another object of the present invention is to provide an apparatus for capturing carbon dioxide and producing sulfuric acid by sodium bisulfate, and the apparatus comprises a reactor, an anode electrode, a cathode electrode, and a power supply.

The anode plate and the anion exchange membrane constitute an anode chamber; the cathode plate and the cation exchange membrane constitute a cathode chamber; the cation exchange membrane and the anion exchange membrane constitute an intermediate chamber; the intermediate chamber is used for the storage of desulfurized product solution.

The anode electrode and the cathode electrode are respectively arranged at both ends of the reactor.

The anode chamber, cathode chamber and intermediate chamber include at least one liquid circulation tube; the anode chamber and/or cathode chamber further comprise(s) one or more exhaust ports.

Preferably, the anode chamber is provided with an anode chamber exhaust port, and the cathode chamber is provided with a cathode chamber exhaust port.

The anode chamber, cathode chamber and intermediate chamber comprise(s) two or more liquid circulation tubes.

Preferably, the liquid circulation tube for injecting liquid in the reacting chamber is set lower than the height of the liquid circulation tube for outflow.

The circulation tube is mainly used for circulating the solution in each reacting chamber in the reactor to ensure the concentration of the solution in each chamber of the electrodialysis and improve the electrolysis efficiency. The liquid circulation tube for injecting the liquid is set lower than the height of the liquid circulation tube for outflow, which can sufficiently make the concentration in the reaction liquid uniform.

In some embodiment, at least one liquid circulation tube is provided on the cathode plate and/or anode plate.

The cathode chamber is provided with a flue gas inlet, and the flue gas inlet is provided with an aeration device.

In the present invention, a flue gas inlet is provided in the cathode chamber, and the flue gas inlet is provided with an aeration device. The flue gas containing carbon dioxide is mainly introduced into the reactor to adsorb carbon dioxide and to obtain sodium carbonate and/or carbonic acid sodium hydrogen.

The aeration device is an aeration stone and/or an aeration sieve plate.

The apparatus the apparatus further comprises a DC power supply, a desulfurized product liquid circulation tank, a cathode chamber liquid circulation tank, a circulation pump I and a circulation pump II.

The setting of the circulation pump, in conjunction with the liquid circulation tube, circulates the liquid participating in the reaction in the reactor to ensure that the concentration of the solution in the entire reaction is within a reasonable range, improving the efficiency of electrolysis.

The DC power supply is electrically connected to the polar plate of the apparatus.

One end of the circulation pump I is connected with the liquid circulation tube of the intermediate chamber, the other end of the circulation pump I is connected with the desulfurized product liquid circulation tank, and the desulfurized product liquid circulation tank is connected with the liquid circulation tube of the intermediate chamber at the same time.

One end of the circulation pump II is connected with the liquid circulation tube of the cathode chamber, the other end of the circulation pump II is connected with the liquid circulation tank of the cathode chamber, and the liquid circulation tank of the cathode chamber is connected with the liquid circulation tube of the cathode chamber at the same time.

The anode chamber, the intermediate chamber and the cathode chamber are respectively provided with liquid inlet and outlet tubes for liquid circulation. The anode electrode and the cathode electrode are plate electrodes.

When the apparatus is in operation, the initial solution of anode chamber is dilute sulfuric acid of 1 wt. % to 5 wt. %, the intermediate chamber is $NaHSO_4$ solution to be treated, and the cathode chamber is a sodium hydroxide solution with an initial concentration of 0.05 to 0.5 mol/L; the liquid enters the reaction chamber from the bottom tube, and is pumped out from the upper tube for circulation; under the action of electric field drive and anion exchange membrane, $HSO_4^-$ selectively enters the anode chamber, and combines with the $H^+$ produced by the electrolytic water in the anode chamber to be $H_2SO_4$, the generated $O_2$ is discharged and collected by the anode chamber exhaust port; meanwhile, under the action of the electric field drive and the cation exchange membrane, $Na^+$ selectively enters the cathode chamber, and combines with the $OH^-$ generated by the electrolytic water in the cathode chamber to be NaOH, the gas containing $CO_2$ to be treated passes through the flue gas inlet at the bottom of the cathode chamber and is absorbed by the NaOH generated, which is converted into $Na_2CO_3$ and $NaHCO_3$; the exhaust gas is discharged from the cathode chamber exhaust.

Advantages of the Present Invention:

(1) During the comprehensive utilization of sodium bisulfate solution, the carbon dioxide in the flue gas is captured simultaneously, the whole process is simple, green and economic;

(2) The sulfuric acid solution generated in the system is enriched and concentrated in the anode chamber, increasing the retrieving value of the sulfuric acid products;

(3) The NaOH consumed in the process of capturing $CO_2$ is supplemented by the $OH^-$ produced by the electrolysis of water in the cathode chamber and the $Na^+$ migrated from the intermediate chamber, without the need to add additional chemicals.

(4) $Na_2CO_3$ and $NaHCO_3$ generated after the absorption of $CO_2$ can be used to capture $SO_2$.

Figure 1:
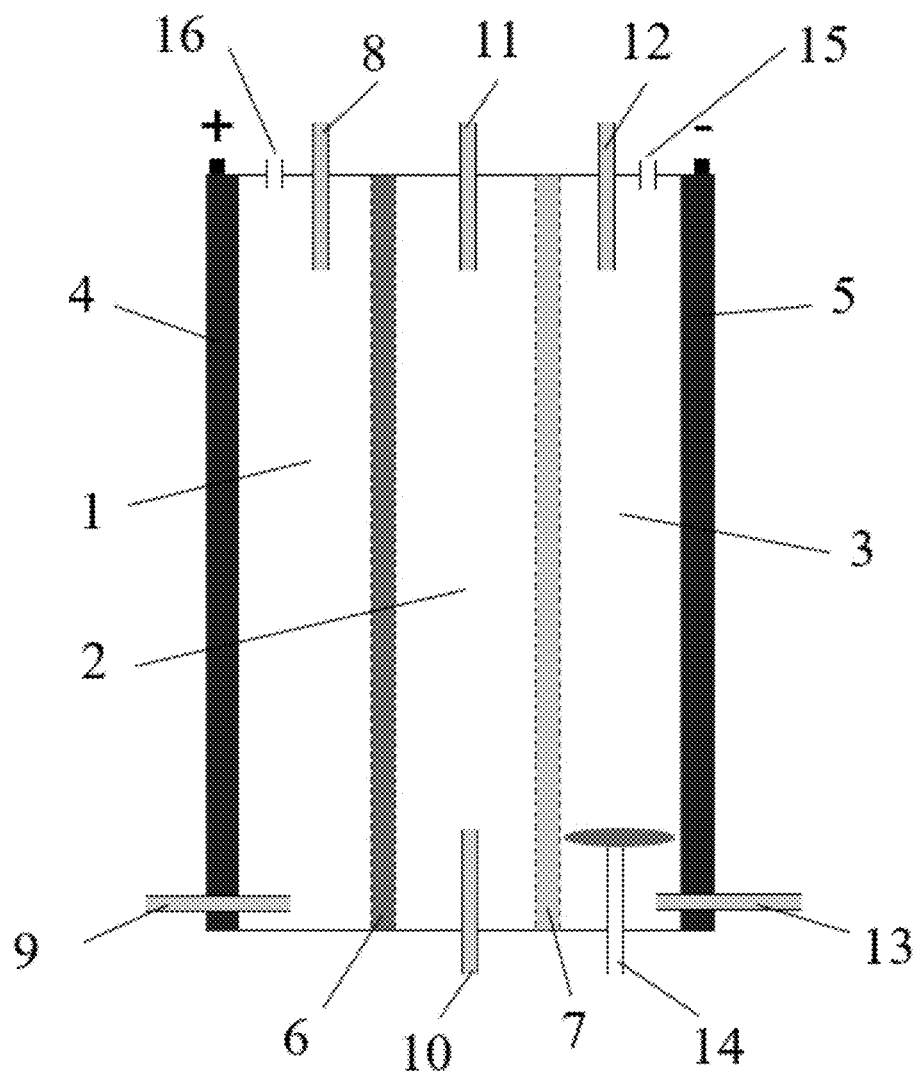
FIG. 1 is a schematic diagram of the partial structure of the three-format electrodialysis apparatus of the present invention.

Among them: 1 anode chamber; 2 intermediate chamber; 3 cathode chamber; 4 anode; 5 cathode; 6 anion exchange membrane; 7 cation exchange membrane; 8, 9, 10, 11, 12, 13 liquid circulation tube; 14 flue gas inlet; 15 cathode chamber exhaust port; 16 anode chamber exhaust port; 17 three-format electrodialysis apparatus; 18 DC power supply; 19 desulfurized product solution circulation tank; 20 circulation pump I; 21 cathode chamber liquid circulation tank; 22 circulation pump II; 23 flue gas, 24 exhaust gas.

EMBODIMENTS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

The methods used in the examples are as described in the summary of the invention.

Embodiment One

A method for capturing carbon dioxide and producing sulfuric acid by sodium bisulfate, which comprises the following steps:

(1) At room temperature, the reaction chamber is divided into a cathode chamber, an intermediate chamber and an anode chamber by using an anion exchange membrane and a cation exchange membrane; the anode chamber is injected with initial solution which is 1 wt. % dilute sulfuric acid, and the cathode chamber is injected with a concentration of 0.5 mol/L NaOH solution. The desulfurized by-products (about 0.1 mol/L $NaHSO_4$) circulate in the intermediate chamber; 100 $mA/m^2$ DC constant current is applied between the anode and cathode; the anode material is a plate-shaped ruthenium/iridium coated electrode, and the cathode is a graphite plate-shaped electrode. Under the action of electric field drive and anion exchange membrane, $HSO_4^-$ selectively enters the anode chamber, combines with $H^+$ produced by the electrolyzed water in the anode chamber to generate $H_2SO_4$ and is concentrated.

(2) At the same time, the gas containing 10% carbon dioxide after dedusting, desulfurization and denitrification is introduced from the bottom of the cathode chamber with a gas flow rate of 0.8 $m^3/h$, and absorbed by NaOH; the exhaust gas is discharged from the exhaust port at the top. The NaOH consumed during the reaction is replenished by the $OH^-$ produced from electrolyzed water in the cathode chamber and the $Na^+$ migrated from the intermediate chamber.

During the treatment process, the capture rate of the $CO_2$ can reach to more than 95%, and the sulfuric acid concentration recovered and concentrated by the anode chamber reaches to 35 wt. % after 7 days.

Embodiment Two

A method for capturing carbon dioxide and producing sulfuric acid by sodium bisulfate, which comprises the following steps:

(1) At room temperature, the reaction chamber is divided into a cathode chamber, an intermediate chamber and an anode chamber by using an anion exchange membrane and a cation exchange membrane; the anode chamber is injected with initial solution which is 5 wt. % dilute sulfuric acid, and the cathode chamber is injected with a concentration of 0.05 mol/L NaOH solution. The desulfurized by-products (about 0.5 mol/L $NaHSO_4$) circulate in the intermediate chamber; 30 $mA/m^2$ DC constant current is applied between the anode and cathode; the anode material is a plate-shaped ruthenium/iridium coated electrode, and the cathode is a graphite plate-shaped electrode. Under the action of electric field drive and anion exchange membrane, $SO_4^{2-}$ selectively enters the anode chamber, combines with $H^+$ produced by the electrolyzed water in the anode chamber to generate $H_2SO_4$ and is concentrated.

(2) At the same time, the gas containing 40% carbon dioxide after dedusting, desulfurization and denitrification is introduced from the bottom of the cathode chamber, and absorbed by NaOH; the exhaust gas is discharged from the exhaust port at the top. The NaOH consumed during the reaction is replenished by the $OH^-$ produced from electrolyzed water in the cathode chamber and the $Na^+$ migrated from the intermediate chamber.

During the treatment process, the capture rate of the $CO_2$ can reach to more than 85%, and the sulfuric acid concentration recovered and concentrated by the anode chamber reaches to 45 wt. % after 7 days.

Embodiment Three

A method for capturing carbon dioxide and producing sulfuric acid by sodium bisulfate, which comprises the following steps:

(1) At room temperature, the reaction chamber is divided into a cathode chamber, an intermediate chamber and an anode chamber by using an anion exchange membrane and a cation exchange membrane; the anode chamber is injected with initial solution which is 3 wt. % dilute sulfuric acid, and the cathode chamber is injected with a concentration of 0.3 mol/L NaOH solution. The desulfurized by-products (about 0.5 mol/L $NaHSO_4$) circulate in the intermediate chamber; 1000 $mA/m^2$ DC constant current is applied between the anode and cathode; the anode material is a plate-shaped ruthenium/iridium coated electrode, and the cathode is a graphite plate-shaped electrode. Under the action of electric field drive and anion exchange membrane, $SO_3^{2-}$ selectively enters the anode chamber and is oxidized to $SO_4^{2-}$, which combines with $H^+$ produced by the electrolyzed water in the anode chamber to generate $H_2SO_4$ and is concentrated.

(2) At the same time, the gas containing 20% carbon dioxide after dedusting, desulfurization and denitrification is introduced from the bottom of the cathode chamber, and absorbed by NaOH; the exhaust gas is discharged from the exhaust port at the top. The NaOH consumed during the reaction is replenished by the $OH^-$ produced from electrolyzed water in the cathode chamber and the $Na^+$ migrated from the intermediate chamber.

During the treatment process, the capture rate of the $CO_2$ can reach to more than 90%, and the sulfuric acid concentration recovered and concentrated by the anode chamber reaches to 40 wt. % after 7 days; the oxidation rate of sulfite ion reaches to 97%.

Embodiment Four

An apparatus for producing sulfuric acid from desulfurized products, that is, a three-format electrodialysis apparatus, as shown in FIG. 1, the apparatus comprises a reactor, an anode electrode, a cathode electrode, and a power supply; the anode electrode 4 and the cathode electrodes 5 are respectively arranged at both ends of the reactor, and are connected to the power source through wires, and the anion exchange membrane 6 and the cation exchange membrane 7 are arranged in sequence in the reactor to divide the chamber of reactor into anode chamber 1, intermediate chamber 2 and cathode chamber 3; the bottom of the cathode chamber is provided with flue gas inlet 14 and an aeration sieve plate, at the top of the cathode is provided with cathode chamber exhaust port 15, and the anode chamber is provided with an anode chamber exhaust port 16; the anode chamber, the intermediate chamber and the cathode chamber are respectively provided with liquid inlet and outlet tubes for the circulation of the liquid; specifically, 8, 9, 10, 11, 12, 13 are liquid circulation tubes.

Figure 2:
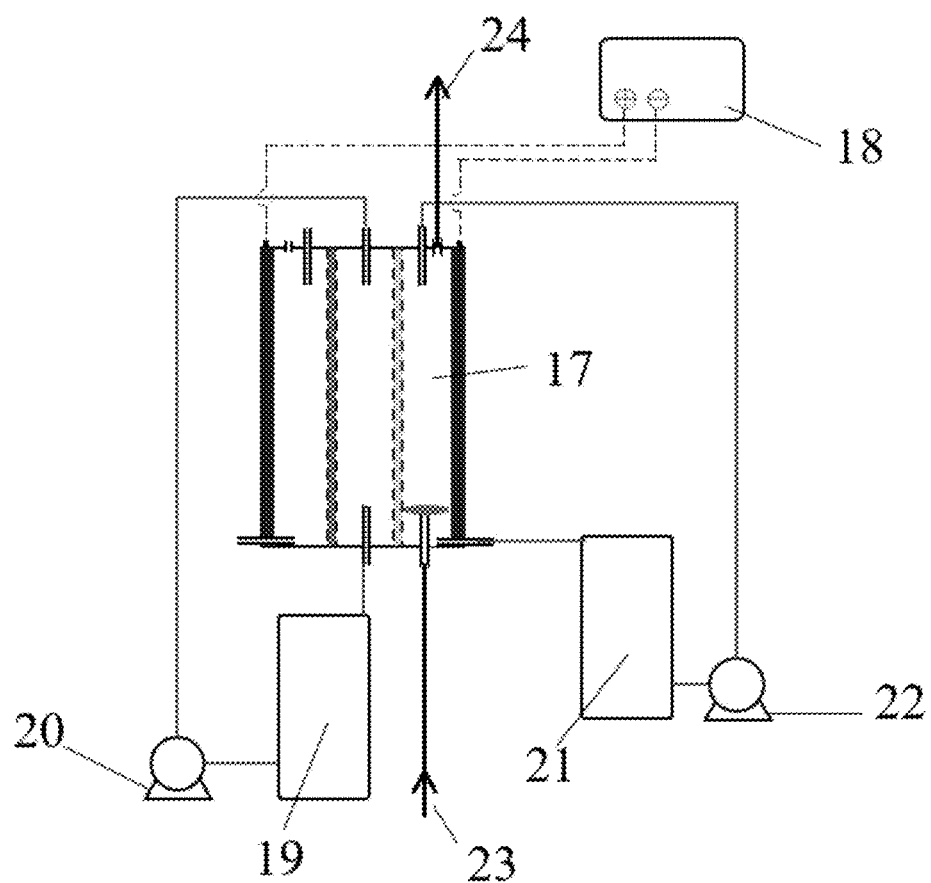
FIG. 2 is a schematic diagram of the system structure of the three-format electrodialysis apparatus of the present invention.

Further, as shown in FIG. 2, the three-format electrodialysis apparatus further comprises circulation pump I 20 and circulation pump II 22; one end of the circulation pump I 20 is connected with the liquid circulation tube in the intermediate chamber 11, and the other end is connected to the desulfurized product solution circulation tank 19; the desulfurized product liquid circulation tank 19 is also connected to the liquid circulation tube 10 of the intermediate chamber 2; one end of the circulation pump II 22 is connected to the liquid circulation tube 12 of the cathode chamber, and the other end is connected to the cathode chamber liquid circulation tank 21, and the cathode chamber liquid circulation tank 21 is also connected to the liquid circulation tube 13 of the cathode chamber.

The working principle of the apparatus of the present invention is that the desulfurized product solution is added to the desulfurized product solution circulation tank 19, meanwhile the diluted sulfuric acid as initial solution is added to the anode chamber 1 of the three-format electrodialysis apparatus while the desulfurized product solution is added into the intermediate chamber 2; the initial concentration of sodium hydroxide solution is added into the cathode chamber 3, and water or the initial concentration of sodium hydroxide solution into the cathode chamber liquid circulation tank 21. During operation, the flue gas 23 is introduced into the flue gas inlet, and the circulation pump I 20 and the circulation pump II 22 and the DC power supply 18 are started and the apparatus starts to work. During the electrolysis process, the liquid of the intermediate chamber, anode chamber and the cathode chamber enters the reacting chamber from the bottom tub, and is pumped out from the upper tube for circulation; under the action of electric field drive and anion exchange membrane, $HSO_4^-$ selectively enters the anode chamber, and combines with the $H^+$ produced by the electrolytic water in the anode chamber $H_2SO_4$, the generated $O_2$ is discharged and collected by the anode chamber exhaust port 16; at the same time, under the action of the electric field drive and the cation exchange membrane, $Na^+$ selectively enters the cathode chamber and combines with the $OH^-$ generated by the electrolytic water in the cathode chamber to generate NaOH; the gas containing $CO_2$ to be treated is introduced into the flue gas inlet 14 at the bottom of the cathode chamber and absorbed by the NaOH generated, and is converted into $Na_2CO_3$ and $NaHCO_3$. The exhaust gas 23 is discharged from the cathode chamber exhaust port 15.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. therefore, it is manifestly intended that embodiments described herein be limited only by the claim and the equivalents thereof.

We claim:

1. An apparatus for producing sulfuric acid from desulfurized products, wherein the apparatus comprises an anode plate, an ion exchange membrane and a cathode plate; the anode plate and the anion exchange membrane form an anode chamber; the cathode plate and the cation exchange membrane cathode chamber; an intermediate chamber is formed between the cation exchange membrane and the anion exchange membrane;
    wherein the anode chamber, the cathode chamber, and the intermediate chamber comprise at least one liquid circulation tube; the anode chamber and/or the cathode chamber further comprise(s) one or more exhaust ports; the intermediate chamber is used for the storage of the desulfurized products.

2. The apparatus for producing sulfuric acid from desulfurized products of claim 1, wherein the anode chamber, the cathode chamber and the intermediate chamber comprise two or more liquid circulation tubes.

3. The apparatus for producing sulfuric acid from desulfurized products of claim 1, wherein at least one liquid circulation tube is arranged on the cathode plate and/or the anode plate.

4. The apparatus for producing sulfuric acid from desulfurized products of claim 1, wherein the cathode chamber is provided with a flue gas inlet, and the flue gas inlet is provided with an aeration device.

5. The apparatus for producing sulfuric acid from desulfurized products of claim 4, wherein the aeration device is an aeration stone and/or an aeration sieve plate.

6. The apparatus for producing sulfuric acid from desulfurized products of claim 1, wherein the apparatus further comprises a DC power supply, a desulfurized product liquid circulation tank, a cathode chamber liquid circulation tank, a circulation pump I and a circulation pump II;

the DC power supply is electrically connected to the polar plate of the apparatus;

one end of the circulation pump I is connected with the liquid circulation tube of the intermediate chamber, the other end of the circulation pump I is connected with the desulfurized product liquid circulation tank, and the desulfurized product liquid circulation tank is connected with the liquid circulation tube of the intermediate chamber simultaneously;

one end of the circulation pump II is connected with the liquid circulation tube of the cathode chamber, the other end of the circulation pump II is connected with the liquid circulation tank of the cathode chamber, and the liquid circulation tank of the cathode chamber is connected with the liquid circulation tube of the cathode chamber simultaneously.

7. A method for producing sulfuric acid from desulfurized products, wherein the method applies to the apparatus of claim 1; on the basis of electric field driving and ion selective passage of ion exchange membrane, the sulfur-containing anion of the intermediate chamber selectively enters the anode chamber to generate sulfuric acid.

8. The method for producing sulfuric acid from desulfurized products of claim 7, wherein the cation in the intermediate chamber selectively enters the cathode chamber to generate an alkaline substance; the alkaline substance can be used for capturing acid gas.

9. The method for producing sulfuric acid from desulfurized products of claim 7, wherein desulfurized product liquid in the intermediate chamber is a solution containing sulfate and/or sulfite ions, and the desulfurized product liquid is one or more of $NaHSO_4$, $Na_2SO_4$, $Na_2SO_3$, and $NaHSO_3$.

10. The method for producing sulfuric acid from desulfurized products of claim 7, wherein under the action of electric field drive and ion exchange membrane, $HSO_4^-$ enters the anode chamber to generate $H_2SO_4$ and is concentrated, and $Na^+$ enters the cathode chamber to generate $NaOH$; the gas containing $CO_2$ to be treated is introduced from the cathode chamber and absorbed by $NaOH$.

11. The method for producing sulfuric acid from desulfurized products of claim 7, wherein the anion exchange membrane is resistant to sulfuric acid at a concentration more than 40 wt %; the anion selection rate is more than 98%; the cation exchange membrane cation selection rate is more than 90%; the initial solution of anode chamber is dilute sulfuric acid of 1 wt. % to 5 wt. %, and the cathode chamber is a sodium hydroxide solution with an initial concentration of 0.05 to 0.5 mol/L.

12. The method for producing sulfuric acid from desulfurized products of claim 7, wherein the electric field is driven by a DC constant current voltage applied between the anode and the cathode, and the current density is 30 to 1000 $mA/m^2$; the anode material is a plate-shaped ruthenium/iridium coated electrode, and the cathode is a graphite plate-shaped electrode.

13. The method for producing sulfuric acid from desulfurized products of claim 7, wherein the flue gas containing $CO_2$ after dust removal, desulfurization and denitrification, the remaining $CO_2$ content of the gas is 5% to 40%.

* * * * *